US012173767B2

(12) United States Patent
Kameda et al.

(10) Patent No.: US 12,173,767 B2
(45) Date of Patent: Dec. 24, 2024

(54) COIL SPRING JIG, COIL SPRING MANUFACTURING METHOD, AND COIL SPRING TESTING METHOD

(71) Applicants: Hitachi Astemo, Ltd., Hitachinaka (JP); HONDA MOTOR CO., LTD., Tokyo (JP)

(72) Inventors: Hirokatsu Kameda, Hitachinaka (JP); Toshihiro Ogawa, Kasugai (JP); Shinji Kasatori, Tokyo (JP); Atsushi Murakami, Tokyo (JP); Hideki Kato, Tokyo (JP); Kenji Nagaoka, Tokyo (JP)

(73) Assignees: Hitachi Astemo, Ltd., Hitachinaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/945,716

(22) Filed: Sep. 15, 2022

(65) Prior Publication Data
US 2023/0014164 A1 Jan. 19, 2023

Related U.S. Application Data

(63) Continuation of application No. PCT/JP2021/008610, filed on Mar. 5, 2021.

(30) Foreign Application Priority Data

Mar. 24, 2020 (JP) .................. 2020-052302

(51) Int. Cl.
*B24C 1/10* (2006.01)
*F16F 1/12* (2006.01)

(52) U.S. Cl.
CPC .............. *F16F 1/128* (2013.01); *F16F 1/122* (2013.01); *F16F 2226/04* (2013.01);
(Continued)

(58) Field of Classification Search
CPC ........ F16F 1/122; F16F 1/128; F16F 2226/04; F16F 2230/0005; F16F 2230/10; F16F 2238/026; B24C 1/00
See application file for complete search history.

(56) References Cited

U.S. PATENT DOCUMENTS 4,219,918 A * 9/1980 Klann .................. B25B 27/304
D8/51
4,732,365 A * 3/1988 Kloster ................ B25B 27/304
254/102

(Continued)

FOREIGN PATENT DOCUMENTS

CN        101156003 A     4/2008
CN        105932468 A     9/2016
(Continued)

OTHER PUBLICATIONS

Fujioka, Takehiro, "Using Short Return in Shot Peening Processing Method for Interior Surface of Mechanical Part." Online. Toyohashi University of Technology, Plastic Processing Lab. (former name). Thesis for master's degree, Apr. 22, 2021, http://plast.me.tut.ac.jp/sotsuken/index.html (20 pages including English translation).

(Continued)

*Primary Examiner* — Thomas W Irvin
(74) *Attorney, Agent, or Firm* — Leason Ellis LLP; Edward J. Ellis; Melvin C. Garner

(57) ABSTRACT

A coil spring jig includes a spring support portion where one end of a coil spring is capable of being placed, a plurality of displacement regulating portions extending along an axis of the coil spring from the spring support portion with the coil spring supported by the spring support portion as a reference, capable of abutting against an outer peripheral surface of the coil spring, and regulating displacement of the coil spring in a radial direction of the coil spring, and a lid portion supported by the displacement regulating portions (Continued)

and capable of keeping the coil spring in a compressed state by sandwiching the coil spring together with the spring support portion.

15 Claims, 10 Drawing Sheets

(52) U.S. Cl.
CPC ... *F16F 2230/0005* (2013.01); *F16F 2230/10* (2013.01); *F16F 2238/026* (2013.01)

(56) References Cited

U.S. PATENT DOCUMENTS

| | | | | |
|---|---|---|---|---|
| 5,954,314 | A * | 9/1999 | Weisshaar | B25B 27/304 29/227 |
| 5,966,788 | A * | 10/1999 | Klann | B25B 27/304 29/227 |
| 6,978,982 | B1 * | 12/2005 | Jin | B25B 27/304 29/238 |
| 7,386,926 | B2 * | 6/2008 | Bosche | B25B 27/304 29/225 |
| 10,315,287 | B2 * | 6/2019 | Moriyama | F16F 1/02 |
| 10,471,568 | B2 * | 11/2019 | Sugiura | B24C 3/20 |
| 10,807,215 | B2 * | 10/2020 | Okada | B24C 9/00 |
| 2009/0134559 | A1 | 5/2009 | Akahori | |
| 2016/0214223 | A1 * | 7/2016 | Wern | B24C 3/32 |
| 2017/0157744 | A1 * | 6/2017 | Moriyama | F16F 1/02 |
| 2017/0209982 | A1 * | 7/2017 | Sugiura | B24C 3/24 |
| 2018/0354098 | A1 * | 12/2018 | Okada | B24C 1/10 |
| 2021/0140502 | A1 | 5/2021 | Yamazaki et al. | |

FOREIGN PATENT DOCUMENTS

| | | |
|---|---|---|
| CN | 110722514 A | 1/2020 |
| JP | S57001391 B2 | 1/1982 |
| JP | 2012016803 A | 1/2012 |
| JP | 2013181235 A | 9/2013 |
| JP | 2019196802 A | 11/2019 |
| KR | 101586230 B1 | 1/2016 |

OTHER PUBLICATIONS

International Search Report mailed May 11, 2021 for the corresponding International Patent Application No. PCT/JP2021/008610 (6 pages including English translation).

Indian Hearing Notice dated Jan. 23, 2024 for the corresponding Indian Patent Application No. 202247046020 (4 pages).

Chinese Office Action mailed Apr. 14, 2023 for the corresponding Chinese Patent Application No. 202180014370.9 (22 pages including English translation).

* cited by examiner

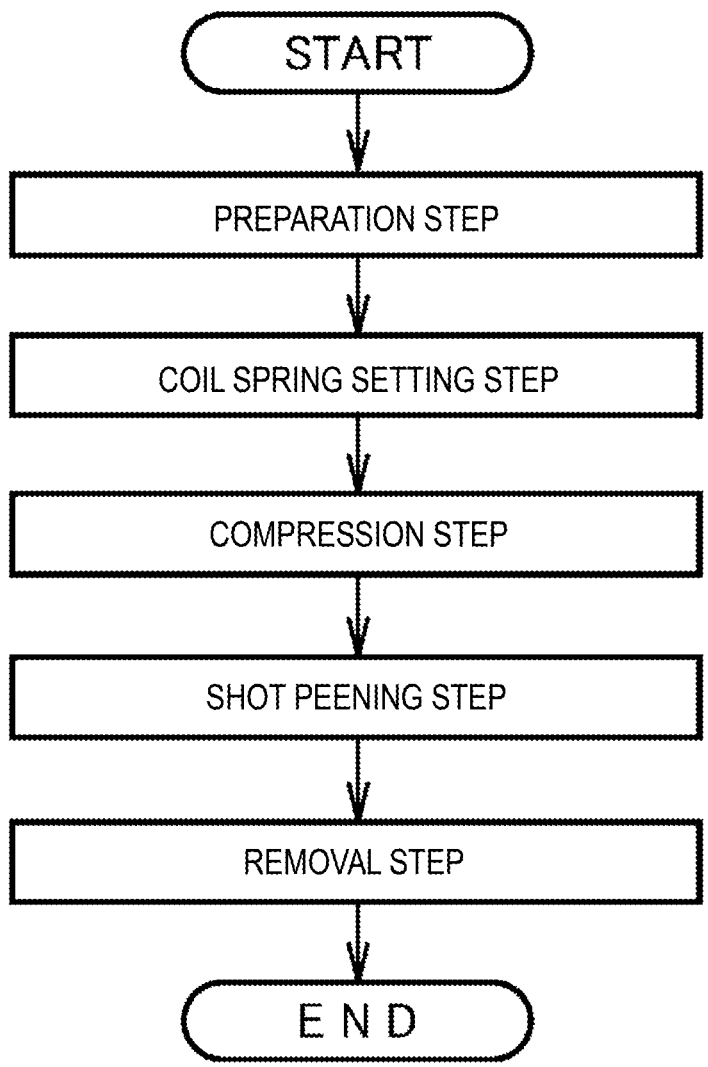

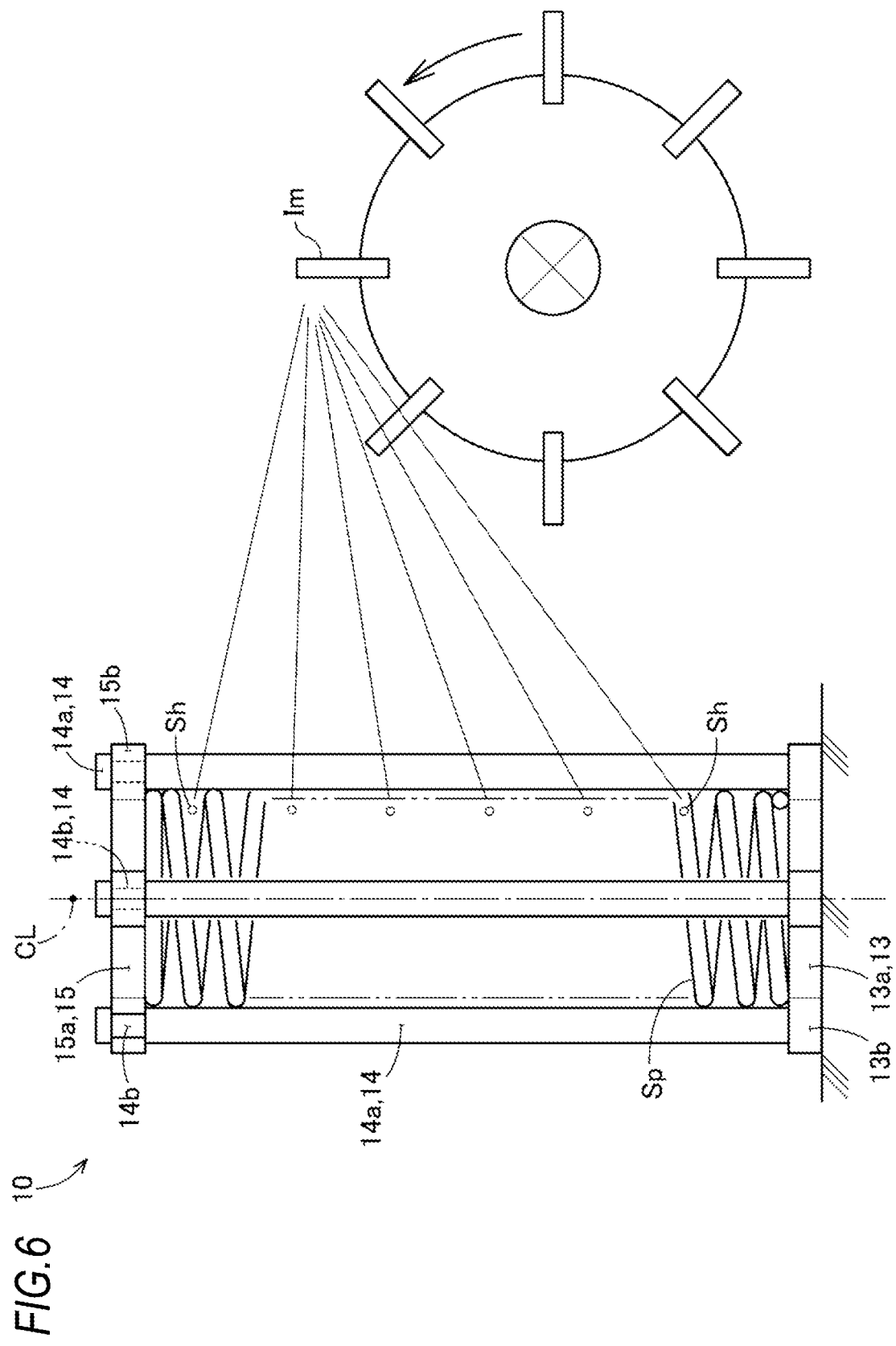

COIL SPRING JIG, COIL SPRING MANUFACTURING METHOD, AND COIL SPRING TESTING METHOD

CROSS-REFERENCE TO RELATED APPLICATION(S)

This application is a Continuation of International Application No. PCT/JP2021/008610 filed on Mar. 5, 2021, which claims the benefit of priority to Japanese Patent Application No. 2020-052302 filed on Mar. 24, 2020, the contents of all of which are incorporated herein by reference in their entireties.

FIELD OF THE INVENTION

The present invention relates to, for example, a coil spring jig for keeping a coil spring in a compressed state.

BACKGROUND OF THE INVENTION

Stress shot peening, in which shot peening is performed on a coil spring which is kept in a compressed state, is known. Residual stress can be applied to the coil spring by performing the stress shot peening. The technique disclosed in JP-B-S57-1391 is an example of the related art for keeping a coil spring in a compressed state.

The stress shot peening device disclosed in JP-B-S57-1391 includes a lower receiving guide for a coil-shaped spring material and a compression portion provided at a predetermined interval in a vertical direction of the lower receiving guide.

With this device, a predetermined compressive force can be applied to the coil-shaped spring material by displacing the compression portion downward. Shot peening can be performed on the coil-shaped spring material.

By the way, a coil spring having a long free length with respect to the center diameter of a coil is used in an elongated device such as a front fork for a two-wheeled vehicle. It is conceivable to use a stress shot peening device as disclosed in JP-B-S57-1391 in order to perform stress shot peening on such a coil spring.

However, when stress shot peening is performed on a spring having a long free length with respect to the center diameter of a coil, the spring may be radially twisted, that is, a body of the coil spring may bend. There is room for improvement in this regard.

SUMMARY OF THE INVENTION

An object of the present invention is to provide, for example, a coil spring jig capable of applying residual stress to an inner peripheral surface of a coil spring while preventing the body of the coil spring from bending.

As a result of diligent studies, the present inventors have found that body bending may be occurred by performing shot peening (that is, stress shot peening) in a state where a compressive load is applied to a coil spring with a large number of turns and a small outer diameter, examples of which include a coil spring for a suspension device of a saddle-type vehicle on which an occupant straddles such as two-wheeled and three-wheeled vehicles. Further, the present inventors have found that it is important to increase a fatigue strength on an inner peripheral surface side of the coil spring in order to increase the fatigue strength of the coil spring for the suspension device. Based on these findings, the present inventors have studied a technique with which the fatigue strength on the inner peripheral surface side of the coil spring can be increased and occurrence of the body bending during stress shot peening can be suppressed. As a result, the present inventors have found that it is effective as a countermeasure technique for suppressing the occurrence of the body bending to suppress a radial displacement of the coil spring by disposing a rod-shaped or tubular member capable of coming into contact with a surface of the coil spring on the inner peripheral surface side or an outer peripheral surface side of the coil spring. Further, the present inventors have found that it is possible to suppress the occurrence of the body bending while maintaining a state where a projection material easily collides with the inner peripheral surface of the coil spring in performing stress shot peening by disposing the rod-shaped or tubular member on the outer peripheral surface side of the coil spring. The present invention has been completed based on the findings.

Hereinafter, the present disclosure will be described.

According to one aspect of the present invention, there is provided a coil spring jig including: a spring support portion where one end of a coil spring is capable of being placed; a plurality of displacement regulating portions extending along an axis of the coil spring from the spring support portion with the coil spring supported by the spring support portion as a reference, capable of abutting against an outer peripheral surface of the coil spring, and regulating displacement of the coil spring in a radial direction of the coil spring; and a lid portion supported by the displacement regulating portions and capable of keeping the coil spring in a compressed state by sandwiching the coil spring together with the spring support portion.

According to another aspect of the present disclosure, there is provided a coil spring jig including: a spring support portion where one end of a coil spring is capable of being placed and which includes a hole extending along an axis at a position where the axis of the coil spring passes; a plurality of displacement regulating portions extending along the axis from the spring support portion, capable of abutting against an outer peripheral surface of the coil spring, and regulating displacement of the coil spring in a radial direction of the coil spring; a lid portion supported by the displacement regulating portions, provided to be rotatable around the axis, capable of keeping the coil spring in a compressed state by sandwiching the coil spring together with the spring support portion, and having a hole extending along the axis at a position where the axis passes; a claw portion provided on the lid portion and fitted to the displacement regulating portion; and a lid portion fitting portion formed in the displacement regulating portion and regulating a movement of the lid portion in the axial direction in a state where the claw portion is fitted, in which only the displacement regulating portion is provided between the spring support portion and the lid portion.

According to the present invention, it is possible to provide a coil spring jig and the like capable of applying residual stress to an inner peripheral surface of a coil spring while preventing a body of the coil spring from bending.

BRIEF DESCRIPTION OF THE DRAWINGS

FIG. 3 is a flowchart illustrating a coil spring manufacturing method using the coil spring jig illustrated in FIG. 1.

FIG. 6 is a diagram illustrating a shot peening step illustrated in FIG. 3.

DETAILED DESCRIPTION OF THE INVENTION

Figure 1:
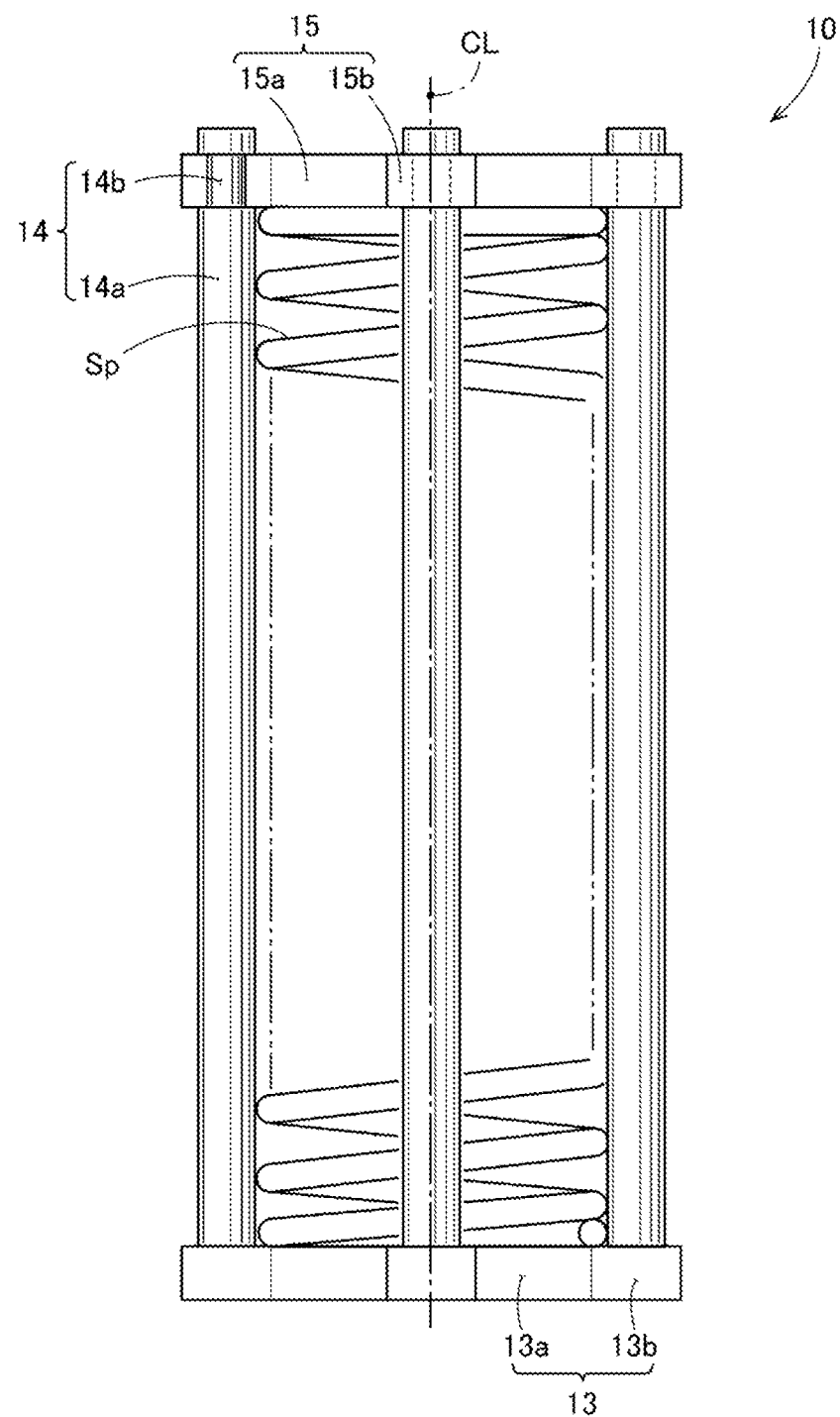
FIG. 1 is a front view of a coil spring jig according to a first embodiment and a coil spring kept in a compressed state by the coil spring jig.

Embodiments of the present invention will be described below with reference to the accompanying drawings. A form illustrated in the drawings is an example of the present invention, and the present invention is not limited to the form.

First Embodiment

Referring to FIG. 1, a coil spring jig 10 (hereinafter, referred to as "jig 10") is a jig capable of holding a coil spring Sp (hereinafter, referred to as "spring Sp") in a compressed state. The spring Sp is held by the jig 10 in a state of being compressed by a predetermined length from a free length.

The jig 10 includes a spring support portion 13 abutting against the lower end (one end) of the spring Sp and the spring Sp can be placed, three displacement regulating portions 14 extending along an axis CL of the spring Sp from the spring support portion 13 and regulating a radial displacement of the spring Sp by being provided to be capable of abutting against an outer peripheral surface of the spring Sp, and a lid portion 15 supported by the displacement regulating portions 14 and capable of keeping the spring Sp in a compressed state by sandwiching the spring Sp together with the spring support portion 13. In the jig 10, the three displacement regulating portions 14 are disposed at equal intervals along a circumferential direction of the spring support portion 13 and the lid portion 15.

Figure 2:
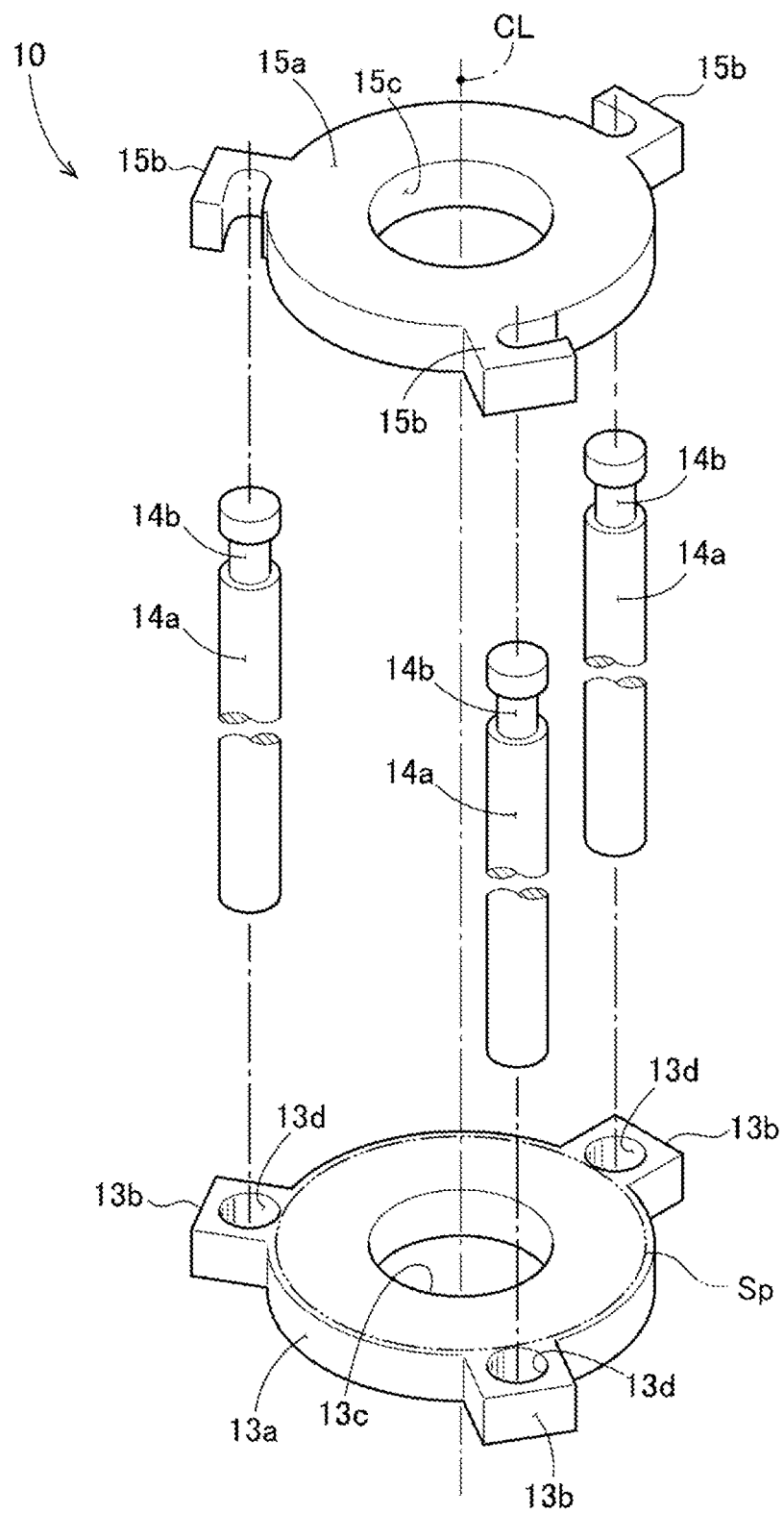
FIG. 2 is an exploded perspective view of the coil spring jig illustrated in FIG. 1.

Referring to FIG. 2 as well, the spring support portion 13 includes a donut plate-shaped support portion main body 13a where the spring Sp is placed and a regulating portion fixing portion 13b protruding outward in the radial direction of the spring Sp from the support portion main body 13a. The displacement regulating portion 14 is fixed to the regulating portion fixing portion 13b.

A support portion hole 13c which penetrates the support portion main body 13a and has a circular cross section with the axis CL in a normal direction is opened in the center of the support portion main body 13a. In other words, at a position where the axis CL passes, the spring support portion 13 has the support portion hole 13c penetrating the spring support portion 13 along the axis CL. An outer diameter of the support portion main body 13a is larger than an outer diameter of the spring Sp.

The three regulating portion fixing portions 13b are formed at equal intervals along a circumferential direction of an outer periphery of the support portion main body 13a. Each of the regulating portion fixing portions 13b has an insertion hole 13d, which has a circular cross section with the axis CL in the normal direction. The displacement regulating portion 14 is inserted into the insertion hole 13d. A part of the edge of the insertion hole 13d, more specifically, a part closer to the axis CL than the other part of the edge is close to the outer peripheral surface of the spring Sp.

The displacement regulating portion 14 includes a regulating portion main body 14a formed in a shape of a round bar and capable of abutting against the outer peripheral surface of the spring Sp and a lid portion fitting portion 14b in which the lid portion 15 is fitted. The lid portion fitting portion 14b is a small-diameter part and formed at a part of the regulating portion main body 14a. The respective lid portion fitting portions 14b of the three displacement regulating portions 14 are formed such that distances from lower end surfaces of the displacement regulating portions 14 are equal.

The lid portion 15 is provided so as to be rotatable and detachable with respect to the displacement regulating portion 14. The lid portion 15 includes a donut plate-shaped lid portion main body 15a abutting against an upper surface of the spring Sp and a claw portion 15b protruding outward in the radial direction of the spring Sp from the lid portion main body 15a and fitted to the lid portion fitting portion 14b.

A lid portion hole 15c, which penetrates the lid portion main body 15a and has a circular cross section with the axis CL in the normal direction is opened in the center of the lid portion main body 15a. In other words, at the position where the axis CL passes, the lid portion 15 has the lid portion hole 15c penetrating the lid portion 15 along the axis CL.

The claw portion 15b is substantially U-shaped in a plan view. Each claw portion 15b is opened in the same direction in a circumferential direction of the lid portion 15.

By the jig 10 described above, the spring Sp is held in a compressed state by being sandwiched between the spring support portion 13 and the lid portion 15. Compressive residual stress can be applied to the spring Sp by stress shot peening which projects shot (projection material) to the spring Sp held in a state of being compressed in a direction of the axis CL by the jig 10. This will be described in detail below.

Figure 4A:
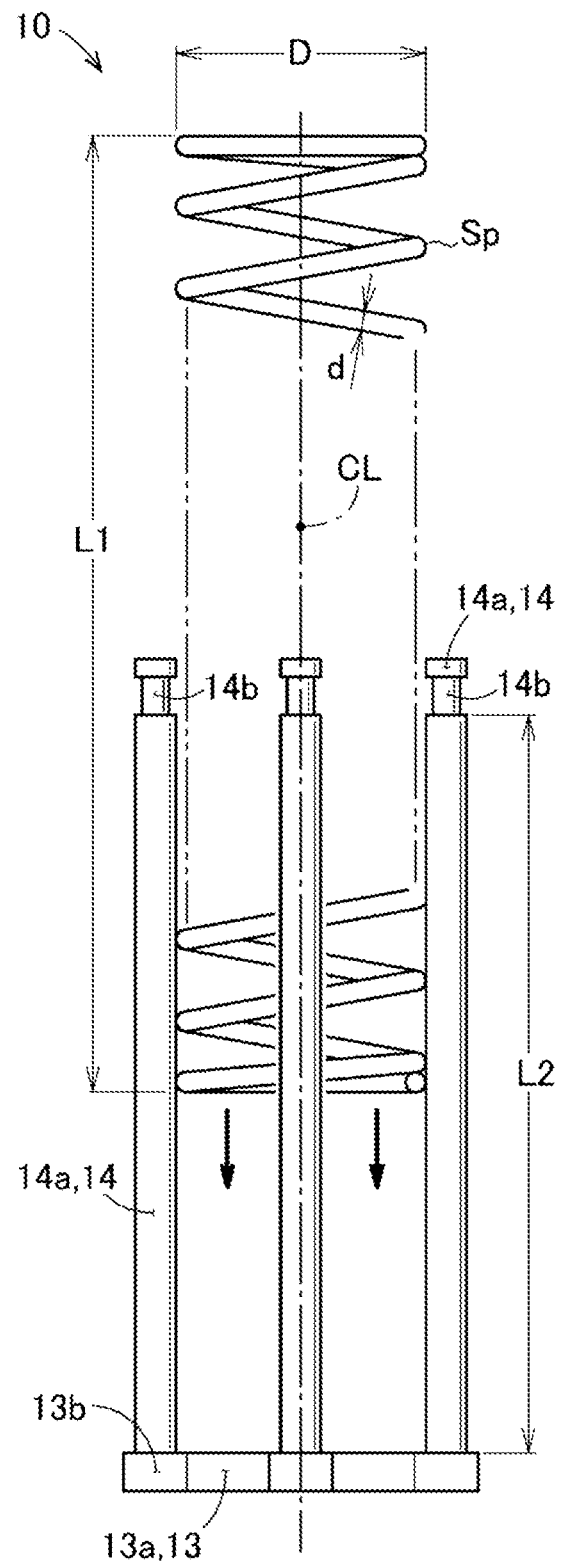
FIG. 4A is a diagram illustrating a coil spring setting step.

The entire step of the stress shot peening is illustrated in FIG. 3. Referring to FIG. 4A, the jig 10 and the spring Sp are prepared first (preparation step).

The spring Sp to be prepared is used in, for example, a front fork disposed between the vehicle body and front wheel of a saddle-type vehicle. In the spring Sp to be prepared, the winding angles of the parts including the windings in both end portions are changed. As a result, each of the windings in both end portions is in contact with or close to an adjacent winding. In other words, in a case where the spring Sp is a coil spring for use in the front fork, the spring Sp is a closed-end or open-end coil spring. Here, in the present invention, "each of the windings in both end portions is close to the adjacent winding" means that a gap between the winding in the end portion and the winding adjacent thereto is 3 mm or less.

A free length L1, a coil center diameter D, a wire diameter d, and a material of the spring Sp on which the stress shot peening is performed are not particularly limited. For example, in a case where the spring Sp is a coil spring for use in the front fork, it can be exemplified that the free length L1 of the spring Sp is 200 to 480 mm, the coil center diameter D of the spring Sp is 15 to 50 mm, and the wire diameter d of the spring Sp is 3.0 to 8.0 mm.

The spring Sp may be the open-end coil spring or a coil spring for use in a rear cushion.

Next, a lower end portion of the displacement regulating portion 14 is inserted into every support portion hole 13c of the spring support portion 13 disposed on any workbench, and then the spring Sp is inserted from above into the part surrounded by the displacement regulating portion 14 which opens above by the lid portion 15 being yet to be disposed and the spring Sp is set on an upper surface of the spring support portion 13 (coil spring setting step). Here, a length L2 from the upper surface of the spring support portion 13 to a lower end of the lid portion fitting portion 14b is set shorter than the free length L1 of the spring Sp.

Figure 4B:
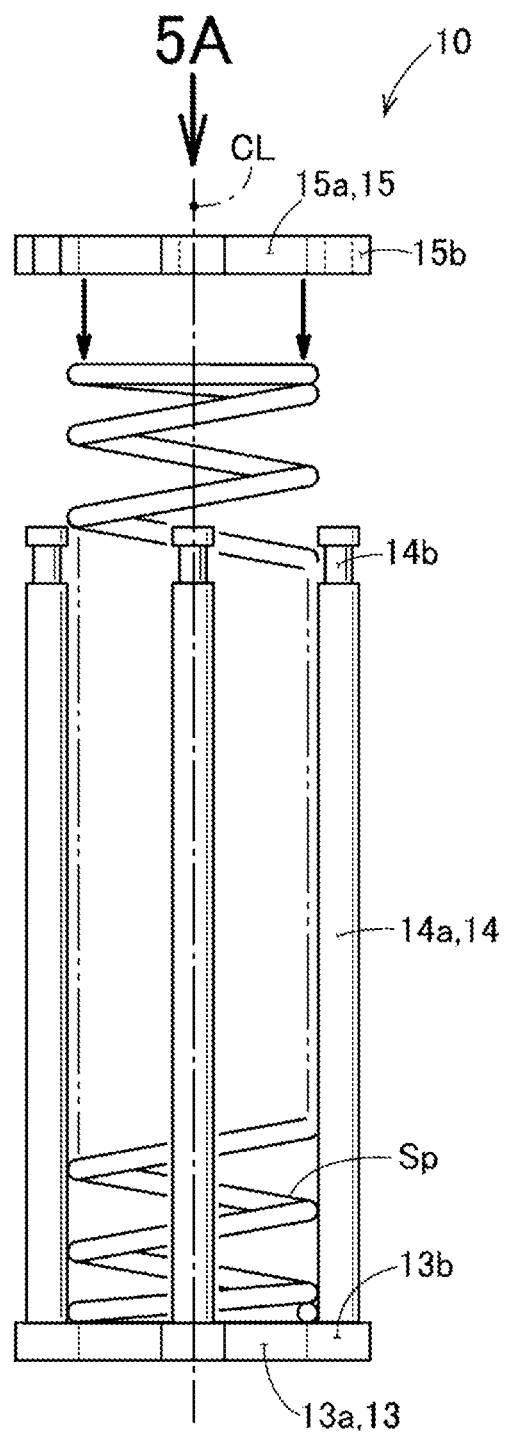
FIG. 4B is a diagram illustrating a compression step.

Referring to FIG. 4B, next, the lid portion 15 is pushed down to the height of the lid portion fitting portion 14b against an urging force of the spring Sp (compression step).

Figure 5A:
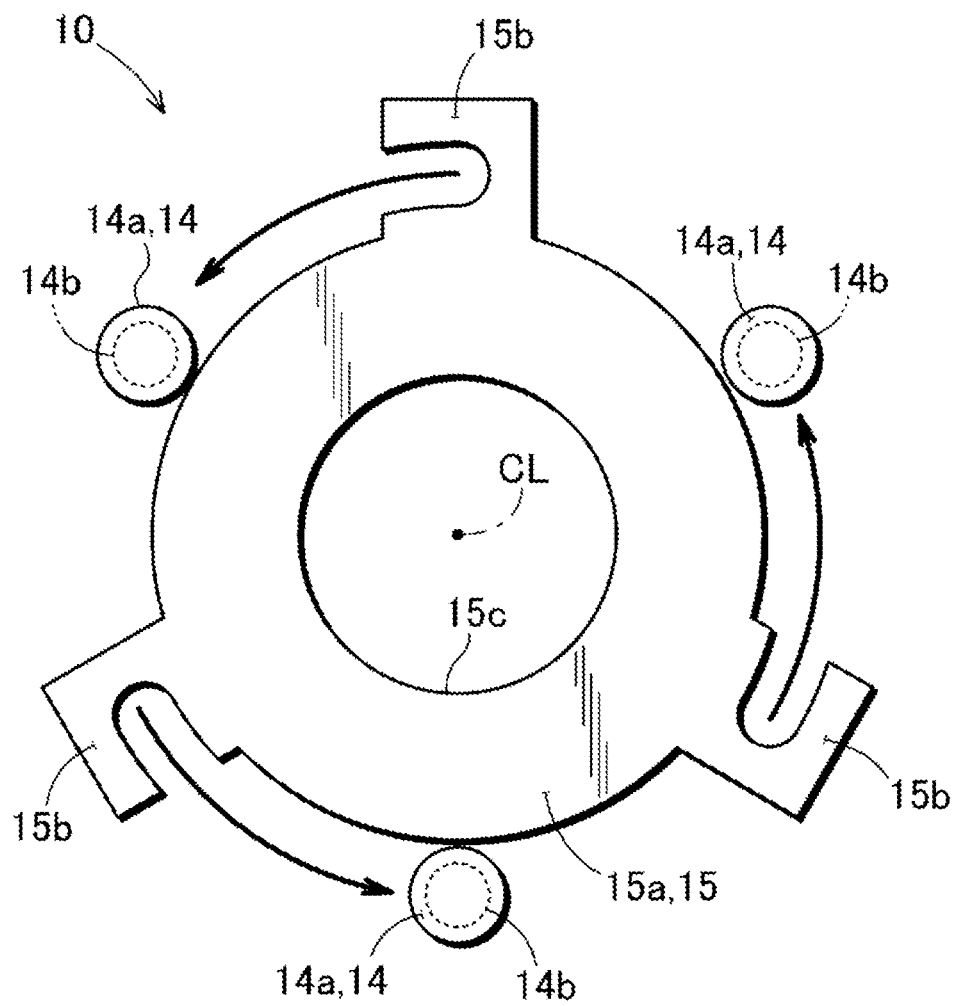
FIG. 5A is a 5A arrow view of FIG. 4B.
Figure 5B:
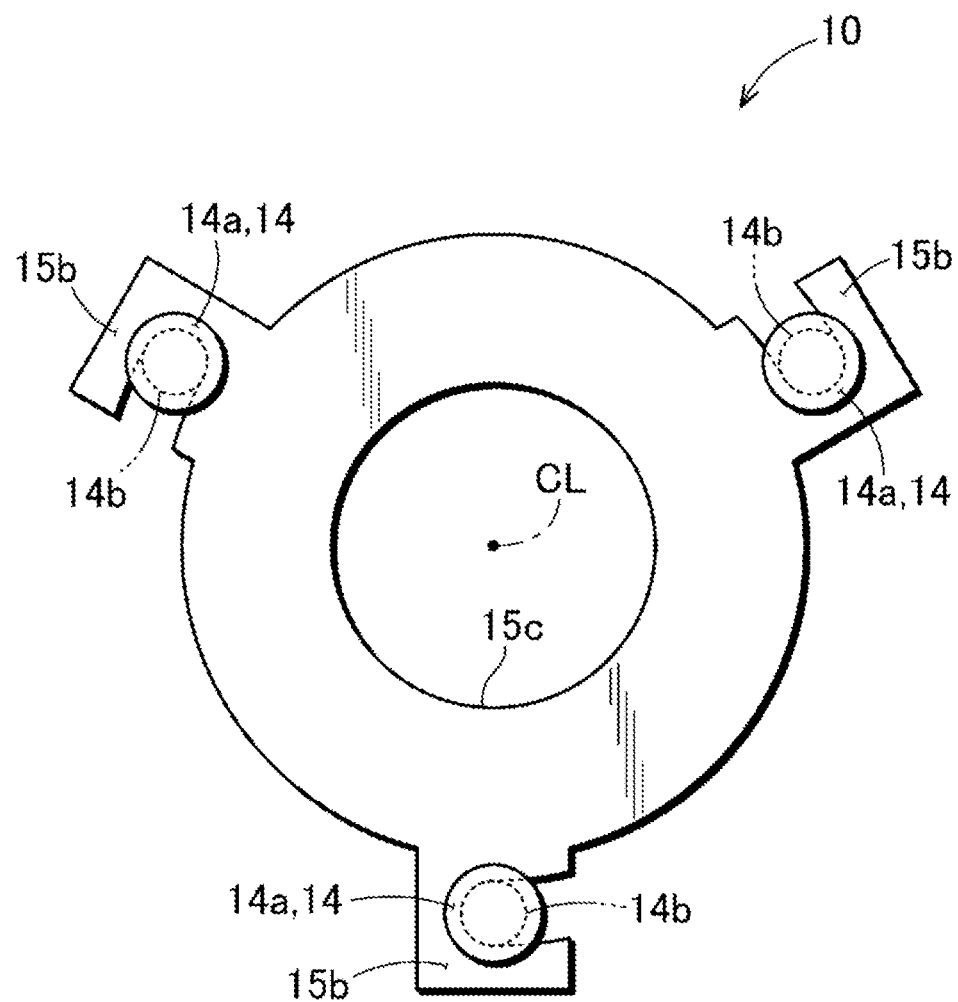
FIG. 5B is a diagram illustrating a state where a lid portion illustrated in FIG. 5A is rotated.

Referring to FIGS. 5A and 5B, the claw portion 15b is fitted to the lid portion fitting portion 14b by rotating the lid portion 15 around the axis CL. As a result, the spring Sp sandwiched between the spring support portion 13 and the lid portion 15 is held in a compressed state. When the claw portion 15b is fitted to the lid portion fitting portion 14b, the claw portion 15b is fitted to the lid portion fitting portion 14b smaller in diameter than the regulating portion main body 14a. After the claw portion 15b is fitted to the lid portion fitting portion 14b, the movement of the lid portion 15 in an axis CL direction is regulated by a step between the regulating portion main body 14a and the lid portion fitting portion 14b.

Referring to FIG. 6, next, shot peening is performed on the spring Sp (shot peening step). More specifically, metal sphere-shaped shots Sh are caused to collide with the surface of the spring Sp rotated along the circumferential direction of the spring support portion 13 and the lid portion 15. As described above, in the jig 10, the three displacement regulating portions 14 are disposed at intervals. Accordingly, the shots Sh are capable of colliding with an inner peripheral surface of the spring Sp (surface on inner peripheral side of coil spring) as well as the outer peripheral surface of the spring Sp (surface on outer peripheral side of coil spring). As a result, compressive residual stress can be applied to the inner peripheral surface and the outer peripheral surface of the spring Sp.

Any shot (projection material) which can be used for stress shot peening of a coil spring can be appropriately used as the shot Sh. As for the projection method, a centrifugal projection method for projecting the shot Sh by high-speed rotation of an impeller Im can be adopted.

The projection conditions such as a material, an average particle diameter, and a projection speed of the shot Sh can be freely selected. In addition, an injection-type projection method as well as the centrifugal projection method is adoptable.

The coil spring is manufactured through the process of performing the stress shot peening on the spring Sp.

Figure 7:
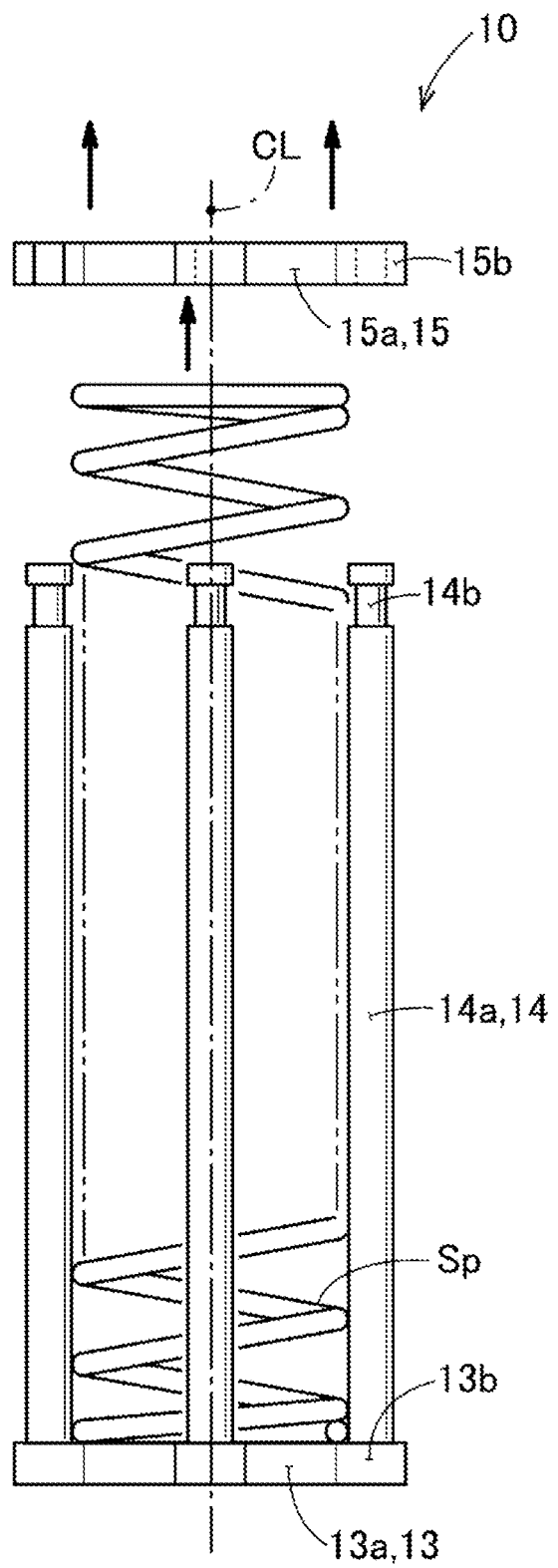
FIG. 7 is a diagram illustrating a removal step.

Referring to FIG. 7, after the stress shot peening, the lid portion 15 is removed from the displacement regulating portion 14 and the spring Sp surrounded by the displacement regulating portion 14 is removed (removal step).

The above is summarized below.

Referring to FIG. 1, the jig 10 includes the spring support portion 13 where the lower end of the spring Sp is capable of being placed, the plurality of displacement regulating portions 14 extending along the axis CL from the spring support portion 13 with the spring Sp supported by the spring support portion 13 as a reference, capable of abutting against the outer peripheral surface of the spring Sp, and regulating the displacement of the spring Sp in the radial direction of the spring Sp, and the lid portion 15 supported by the displacement regulating portions 14 and capable of keeping the spring Sp in a compressed state by sandwiching the spring Sp together with the spring support portion 13.

The jig 10 has the plurality of displacement regulating portions 14 capable of abutting against the outer peripheral surface of the spring Sp. When a force in a compression direction is applied to the spring Sp, a force which escapes in the radial direction may be applied to the spring Sp. At this time, the radial displacement of the spring Sp is regulated by the displacement regulating portion 14.

Referring to FIG. 6 as well, shot peening may be performed with, for example, the spring Sp held by the jig 10. At this time, since the jig 10 regulates the radial displacement of the spring Sp by the displacement regulating portion 14 disposed outside in the radial direction of the spring Sp, the shots Sh projected from the outside of the spring Sp are capable of colliding with the inner peripheral surface of the spring Sp as well as with the outer peripheral surface of the spring Sp. As a result, compressive residual stress can be applied to the inner peripheral surface and the outer peripheral surface of the spring Sp. Considered with respect thereto is a jig of a comparative example in which a member corresponding to the displacement regulating portion 14 (hereinafter, referred to as "displacement regulating portion of the comparative example") is disposed inside in the radial direction of the spring Sp unlike in the jig 10. In the jig of the comparative example, the shots Sh are likely to collide with the displacement regulating portion of the comparative example before the shots Sh projected from the outside of the spring Sp collide with the inner peripheral surface of the spring Sp, and thus it is difficult for the shots Sh to collide with the inner peripheral surface of the spring Sp. As a result, in the jig of the comparative example, it is difficult to apply compressive residual stress to the inner peripheral surface of the spring Sp. By having the displacement regulating portion 14 disposed outside the spring Sp in this manner, it is possible to provide the jig 10 capable of applying residual stress also to the inner peripheral surface of the spring Sp while preventing the body of the spring Sp from bending.

In addition, only the displacement regulating portion 14 is provided between the spring support portion 13 and the lid portion 15. As a result, when the spring Sp is held, no other component is disposed on the inner peripheral surface of the spring Sp. With such a form, the shots Sh are capable of colliding with the inner peripheral surface of the spring Sp in a more reliable manner. As a result, it is possible to provide the jig 10 which is easier to use during shot peening.

Referring to FIGS. 1 and 5, the lid portion 15 is provided so as to be rotatable around the axis CL and has the claw portion 15b fitted to the displacement regulating portion 14. The displacement regulating portion 14 has the lid portion fitting portion 14b regulating the movement of the lid portion 15 in the axis CL direction in a state where the claw portion 15b is fitted.

With such a form, the displacement regulating portion 14 is capable of preventing the lid portion 15 from coming off, and thus there is no need to use another component for preventing the lid portion 15 from coming off. Accordingly, in addition to the above effects, it is possible to provide the jig 10 capable of preventing the lid portion 15 from coming off despite a small number of components.

Referring to FIGS. 2 and 6, the spring support portion 13 has the support portion hole 13c at the position where the axis CL passes, the support portion hole 13c penetrates the spring support portion 13 along the axis CL, and a member which blocks the support portion hole 13c is not disposed. With such a form, the shots Sh are capable of colliding with the inner peripheral surface of the spring Sp after passing through the support portion hole 13c. As a result, in a case where the jig 10 is used for stress shot peening, it is possible to make it even easier to apply compressive residual stress to the inner peripheral surface of the spring Sp. In addition, in a case where the jig 10 is used for a purpose other than stress shot peening, the workability on the inner peripheral surface of the spring Sp can be enhanced.

The lid portion 15 has the lid portion hole 15c at the position where the axis CL passes, the lid portion hole 15c penetrates the lid portion 15 along the axis CL, and a member which blocks the lid portion hole 15c is not disposed. With such a form, the shots Sh are capable of colliding with the inner peripheral surface of the spring Sp after passing through the lid portion hole 15c. As a result, in a case where the jig 10 is used for stress shot peening, it is possible to make it even easier to apply compressive residual stress to the inner peripheral surface of the spring Sp. In addition, in a case where the jig 10 is used for a purpose other than stress shot peening, the workability on the inner peripheral surface of the spring Sp can be enhanced.

In the coil spring manufacturing method of the present invention, the coil spring is manufactured through the step of performing shot peening on the spring Sp while keeping the spring Sp in a compressed state using the jig 10 (stress shot peening step). By going through the stress shot peening step using the jig 10, the shots Sh are capable of colliding with the inner peripheral surface as well as the outer peripheral surface of the spring Sp in a reliable manner while the bending of the body of the spring Sp during the stress shot peening is suppressed. Accordingly, it is possible to provide a high-strength coil spring without body bending.

Second Embodiment

Next, a second embodiment will be described with reference to the drawings.

Figure 8:
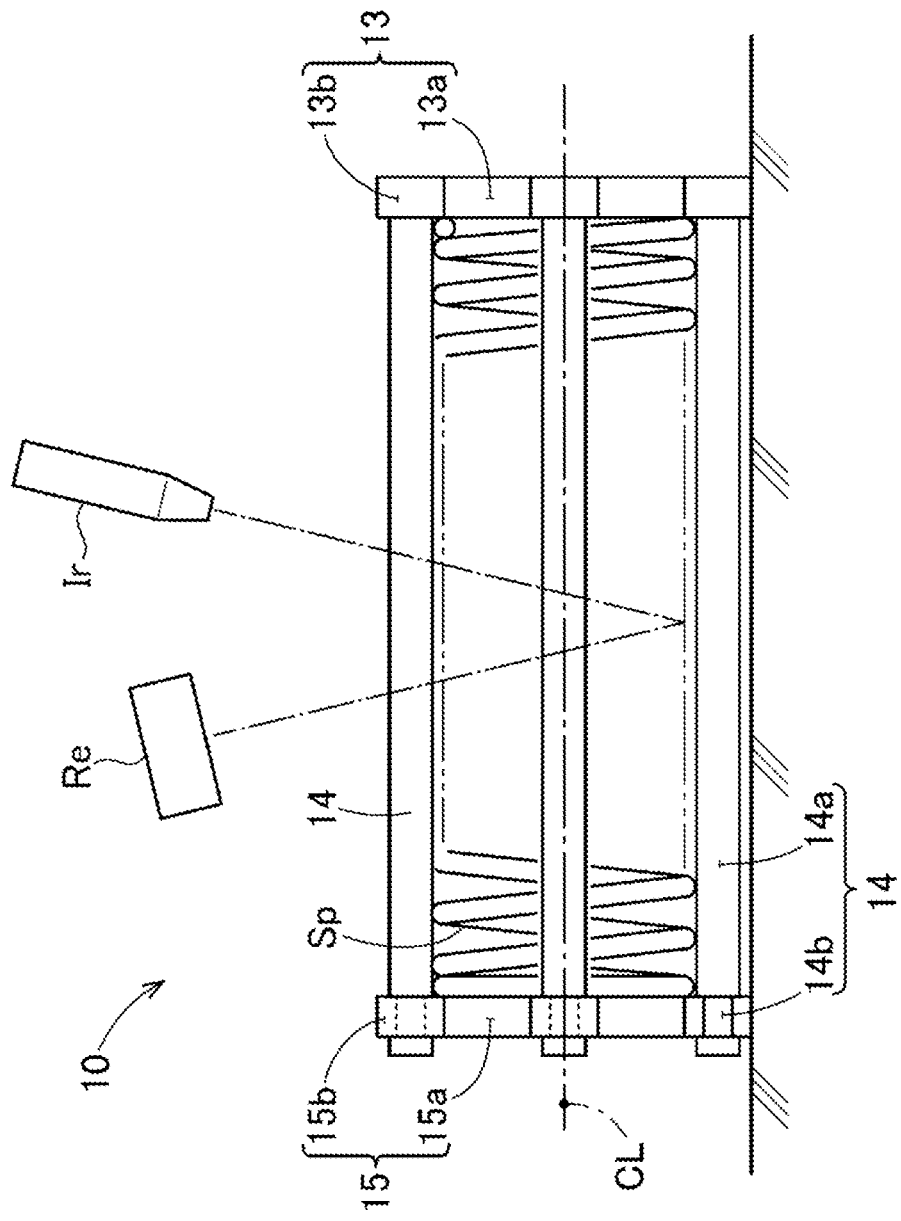
FIG. 8 is a diagram illustrating a coil spring testing method according to a second embodiment.

FIG. 8 is a diagram illustrating a coil spring testing method according to the second embodiment. The jig 10 illustrated in the first embodiment can also be used in performing various tests on the spring Sp in a compressive stress-applied state. The tests in which the jig 10 can be used can be a delayed fracture test, a corrosion resistance test, a test for measuring the compressive stress applied to the spring Sp, and so on. A case where the compressive stress applied to the spring Sp is measured using the jig 10 will be described below. Parts common to the first and second embodiments are denoted by the reference numerals with detailed description thereof omitted.

The stress applied to the spring Sp is measured while keeping the spring Sp in a compressed state using the jig 10. For example, an X-ray is emitted by an irradiation unit Ir and received by a receiving unit Re. From this result, it is possible to determine that one to which a predetermined compressive stress is applied is acceptable and one to which the predetermined compressive stress is not applied is rejected.

As for the inspection method, any means such as those based on infrared rays, magnetostriction, laser raman, and sound elasticity can be selected in addition to the X-ray-based method.

As described above, the stress applied to the spring Sp is measured while keeping the spring Sp in a compressed state using the jig 10. By using the jig 10, not only the outer peripheral surface of the spring Sp but also the inner peripheral surface of the spring Sp can be measured in a reliable manner. Accordingly, only acceptable products can be provided in a reliable manner. A contribution can be made to providing the spring Sp with high commercial value.

The jig in the present invention is not limited to the form in the above description exemplifying the jig 10 having the three displacement regulating portions 14 disposed at equal intervals along the circumferential direction of the spring support portion 13 and the lid portion 15. In a case where the jig in the present invention has three displacement regulating portions, the displacement regulating portions may not be disposed at equal intervals along the circumferential direction of the spring support portion 13 and the lid portion 15. However, from the viewpoint of easily suppressing the bending of the body of the spring Sp, making it easy for the shots Sh to collide evenly with the inner peripheral surface of the spring Sp in performing stress shot peening, and so on, it is preferable that the three displacement regulating portions are disposed at equal intervals along the circumferential direction of the spring support portion 13 and the lid portion 15.

In addition, the jig in the present invention is not limited to the form in the above description exemplifying the jig 10 having the three displacement regulating portions 14. In the present invention, the number of displacement regulating portions may be two or more. Accordingly, the number of displacement regulating portions may be two or four or more. However, from the viewpoint of easily suppressing the bending of the body of the spring Sp, it is preferable that three or more displacement regulating portions are disposed at equal intervals. In addition, from the viewpoint of making it easy for the shots Sh to collide evenly with the inner peripheral surface of the spring Sp in performing stress shot peening, it is preferable that the number of displacement regulating portions is small. Accordingly, based on these, it is preferable that the jig in the present invention has the three displacement regulating portions 14 disposed at equal intervals along the circumferential direction of the spring support portion 13 and the lid portion 15.

In addition, although a case where the jig according to the present invention holds a front fork spring has been described as an example, the spring which is held is not limited to the front fork spring of a saddle-type vehicle. Also applicable are a rear cushion spring and so on.

In addition, the work performed with the spring compressed is not limited to shot peening and residual stress measurement and can be used for other purposes as well.

Further, the embodiments can be combined as appropriate. For example, the residual stress of the coil spring after shot peening can be measured as it is by X-ray measurement.

The present invention is not limited to the embodiments insofar as the actions and effects of the present invention are exhibited.

The jig of the present invention can be suitably used in, for example, performing stress shot peening on a coil spring.

The invention claimed is:

1. A coil spring jig comprising:
   a spring support portion where one end of a coil spring is capable of being placed;
   a plurality of displacement regulating portions extending along an axis of the coil spring from the spring support portion with the coil spring supported by the spring support portion as a reference, abutting against an outer peripheral surface of the coil spring, and regulating displacement of the coil spring in a radial direction of the coil spring; and
   a lid portion supported by the displacement regulating portions and keeping the coil spring in a compressed state by sandwiching the coil spring together with the spring support portion, wherein the lid portion is provided to be rotatable around the axis and has a claw portion fitted to the displacement regulating portion, and the displacement regulating portion has a lid portion fitting portion regulating a movement of the lid portion in the axial direction in a state where the claw portion is fitted.

2. The coil spring jig according to claim 1, wherein only the displacement regulating portion is provided between the spring support portion and the lid portion.

3. The coil spring jig according to claim 2, wherein the spring support portion has a support portion hole penetrating the spring support portion along the axis at a position where the axis passes.

4. The coil spring jig according to claim 2, wherein the lid portion has a lid portion hole penetrating the lid portion along the axis at a position where the axis passes.

5. A coil spring manufacturing method comprising a step of performing shot peening on the coil spring while keeping the coil spring in a compressed state using the coil spring jig according to claim 2.

6. A coil spring testing method comprising a step of measuring a characteristic of the coil spring while keeping the coil spring in a compressed state using the coil spring jig according to claim 2.

7. The coil spring jig according to claim 1, wherein the spring support portion has a support portion hole penetrating the spring support portion along the axis at a position where the axis passes.

8. The coil spring jig according to claim 7, wherein the lid portion has a lid portion hole penetrating the lid portion along the axis at a position where the axis passes.

9. The coil spring jig according to claim 1, wherein the lid portion has a lid portion hole penetrating the lid portion along the axis at a position where the axis passes.

10. A coil spring manufacturing method comprising a step of performing shot peening on the coil spring while keeping the coil spring in a compressed state using the coil spring jig according to claim 1.

11. A coil spring testing method comprising a step of measuring a characteristic of the coil spring while keeping the coil spring in a compressed state using the coil spring jig according to claim 1.

12. The coil spring testing method according to claim 11, wherein the characteristic of the coil spring includes any one of delayed fracture, corrosion resistance and compressive stress applied to the coil spring.

13. A coil spring jig comprising:
a spring support portion where one end of a coil spring is capable of being placed and which includes a hole extending along an axis at a position where the axis of the coil spring passes;
a plurality of displacement regulating portions extending along the axis from the spring support portion, abutting against an outer peripheral surface of the coil spring, and regulating displacement of the coil spring in a radial direction of the coil spring;
a lid portion supported by the displacement regulating portions, provided to be rotatable around the axis, capable of keeping the coil spring in a compressed state by sandwiching the coil spring together with the spring support portion, and having a hole extending along the axis at a position where the axis passes;
a claw portion provided on the lid portion and fitted to the displacement regulating portion; and
a lid portion fitting portion formed in the displacement regulating portion and regulating a movement of the lid portion in the axial direction in a state where the claw portion is fitted, wherein
only the displacement regulating portion is provided between the spring support portion and the lid portion.

14. A coil spring manufacturing method comprising a step of performing shot peening on the coil spring while keeping the coil spring in a compressed state using the coil spring jig according to claim 13.

15. A coil spring testing method comprising a step of measuring a characteristic of the coil spring while keeping the coil spring in a compressed state using the coil spring jig according to claim 13.

* * * * *